United States Patent
Kang et al.

(10) Patent No.: US 9,217,820 B2
(45) Date of Patent: Dec. 22, 2015

(54) DISPLAY APPARATUS

(75) Inventors: Chai Kang, Guangdong (CN); Nanfang Xie, Shenzhen Guangdong (CN); Wei Wei Liu, Shenzhen Guangdong (CN)

(73) Assignee: BRIGHT WILL HOLDINGS LIMITED, Hong Kong (CN)

( * ) Notice: Subject to any disclaimer, the term of this patent is extended or adjusted under 35 U.S.C. 154(b) by 11 days.

(21) Appl. No.: 13/806,396

(22) PCT Filed: Jun. 21, 2011

(86) PCT No.: PCT/IB2011/052703
§ 371 (c)(1),
(2), (4) Date: Dec. 21, 2012

(87) PCT Pub. No.: WO2011/161621
PCT Pub. Date: Dec. 29, 2011

(65) Prior Publication Data
US 2013/0100374 A1  Apr. 25, 2013

(30) Foreign Application Priority Data
Jun. 21, 2010  (WO) ................. PCT/CN2010/074118

(51) Int. Cl.
*G02F 1/133* (2006.01)
*F21V 8/00* (2006.01)
(Continued)

(52) U.S. Cl.
CPC .............. *G02B 6/0011* (2013.01); *F21V 29/70* (2015.01); *G02B 6/0085* (2013.01); *G02B 6/0088* (2013.01); *G02F 1/133382* (2013.01);
(Continued)

(58) Field of Classification Search
CPC .................... G02F 1/133382; G02F 1/133603; G02B 6/0085; G02B 6/0088; G02B 6/0011; F21V 29/70
USPC ...................................... 349/58, 65
See application file for complete search history.

(56) References Cited

U.S. PATENT DOCUMENTS 7,452,109 B2 * 11/2008 Noh et al. ...................... 362/294
8,192,055 B2 *  6/2012 Nittou ........................... 362/294
(Continued)

FOREIGN PATENT DOCUMENTS

CN           1908757           2/2007

OTHER PUBLICATIONS

International Search Report for PCT/IB2011/052703 dated Nov. 3, 2011.

*Primary Examiner* — James Dudek
(74) *Attorney, Agent, or Firm* — Nixon Peabody LLP; Jeffrey L. Costellia (57) ABSTRACT

A display apparatus (100) comprising a display screen (110) and a backlight assembly (120) is provided. The backlight assembly (120) comprises a distributed light source (122, 124) and a light guide plate (126) having at least two lateral edges. The light guide plate (126) and the distributed light source (122, 124) are arranged such that the light emitted by the distributed light source (122, 124) is edge-coupled into the light guide plate (126) for being forward projected onto the display screen (110) to illuminate the display screen (110) from back. The distributed light source (122, 124) is mounted on a heat sink structure (130). The heat sink structure (130) comprises a plurality of spaced-apart heat dissipating plates (136). Each heat dissipating plate (136) functions as a heat dissipation fin, is in thermal communication with the distributed light source (122, 124) and spans between the two lateral edges of the light guide plate (126).

19 Claims, 8 Drawing Sheets

(51) Int. Cl.
*G02F 1/1335* (2006.01)
*G02F 1/1333* (2006.01)
*F21V 29/70* (2015.01)

(52) U.S. Cl.
CPC ............... *G02F1/133603* (2013.01); *G02F 2001/133628* (2013.01)

(56) References Cited

U.S. PATENT DOCUMENTS 8,259,281 B2 * 9/2012 Takahashi .................. 349/161
2009/0096957 A1 * 4/2009 Hiyama et al. .............. 349/65

* cited by examiner

DISPLAY APPARATUS

FIELD OF THE INVENTION

The present invention relates to display apparatus, and more particularly to flat panel display apparatus with backlight arrangements. More specifically, although not limited thereto, this invention relates to LCD display apparatus, especially those for outdoor use.

BACKGROUND OF THE INVENTION

Heat dissipation is a major issue for many high brightness electronic display apparatus. In general, the brighter the display, the more display illumination is required, and the more heat is generated. With the increasing use of electronic displays for outdoor applications, there is also an increasing demand for high brightness electronic displays. Accordingly, more efficient heat dissipation arrangements are desirable. Among the various types of electronic display apparatus, display apparatus comprising back-lit LCD panels have gained popularity in recent years.

LCD panels are widely used in flat panel displays and are gaining increasing popularity over cathode ray tube (CRT) or light emitting diodes (LED) panels because of their various advantages such as lighter weight, higher resolution, and lower power consumption. Known LCD panels are typically of the reflective or transmissive types. A reflective type LCD uses reflection to illuminate the LCD panel and its operation is dependent on the availability of external light sources. A transmissive type LCD uses an internal light source for illumination and the internal light source is commonly referred to as backlight. An advantage of the transmissive type LCD is its usefulness for outdoor operation because backlight intensity can be adjusted according to the ambient light conditions of the outdoor environment which changes widely during different times of the day and according to weather conditions. Display apparatus comprising a transmissive type LCD typically requires back lighting to facilitate visible image formation. A display apparatus comprising the transmissive type LCD is also referred to as backlit LCD, When a backlit display apparatus such as a backlit LCD display apparatus is used for outdoor applications, a higher level of back light illumination is required to overcome or mitigate the effect of background sunlight.

Accordingly, it is desirable to provide backlit display apparatus, such as backlit LCD apparatus, with improved heat dissipation arrangement to facilitate higher levels of backlight illumination.

SUMMARY OF THE INVENTION

Accordingly, there is provided a display apparatus comprising a display screen and a backlight assembly, wherein the backlight assembly comprises a distributed light source and a light guide plate having at least two lateral edges, the light guide plate and the distributed light source being arranged such that light emitted by the distributed light source is edge coupled into the light guide plate for forward projection onto the display screen to back illuminate the display screen, and the distributed light source being mounted on a heat sink structure, characterized in that the heat sink structure comprises a plurality of spaced-apart heat dissipating plates which is in thermal communication with the distributed light source and which spans between the two lateral edges of the light guide plate. A multi-layered heat sink structure comprising a plurality of heat dissipation plates which are stacked in a spaced apart manner provides enhanced heat dissipation surface area for a given volume. In this arrangement, each heat dissipation plate is adapted to function as a heat dissipation fin to disperse heat into the ambient. This is especially beneficial to facilitate a compact heat dissipation assembly more suitable for slim display apparatus.

The heat sink structure may span across the two lateral edges of the light guide plate and extends in a direction transverse to that of the direction of spanning such that the footprint of the heat sink structure covers or substantially covers the light guide plate or the display screen. A heat sink structure comprising a plurality of heat dissipation plates each of which has a surface dimension comparable to the display screen provides maximal heat dissipation for a given display screen dimension. The span of the heat dissipating plates may even slightly exceed the corresponding span of the display surface of the display panel. Such an arrangement substantially increases the area of heat dissipation fins with a given volume of the heat sink structure to facilitate more effective heat dissipation.

The heat dissipating plates may be stacked behind the display panel such that a ventilation channel or a plurality of ventilating channels is formed between adjacent heat dissipating plates, the ventilating channel being adapted to facilitate dissipation of heat generated by the distributed light source and transferred to the heat dissipating plates by convection. The ventilation channel has an elongate cross-section which runs parallel and transverse to a lateral edge of the light guide plate which is edge coupled to the distributed light source.

The heat sink structure may comprise at least one heat dissipating plate which is distributedly perforated, the distributed perforations being arranged to permit air to move from a ventilation channel proximal the display panel to an adjacent ventilation channel more distal from the display panel, or from one ventilation channel to outside the heat dissipating assembly.

The perforations may be distributed uniformly or substantially uniformly on the heat dissipation plates for enhanced heat dissipation. For example, the perforations or heat dissipation apertures may be distributed in a bee-hive manner or bee-hive like to maximize the number of heat dissipation apertures.

A plurality of immediately adjacent heat dissipation plates may be distributedly perforated, the perforations and the ventilation channels associated with the plurality of immediately adjacent heat dissipation plates being arranged such that air from ventilation channel most proximal the display screen is communicable to a ventilation channel most distal from the display screen via the perforations.

The space between adjacent heat dissipating plates may be maintained by at least one thermally conductive spacer, the thermally conductive spacer being in the form of a spacer frame. The spacer frame may be arranged to be in distributed thermal contact with adjacent heat dissipating plates. Using a spacer frame or a plurality of spacer frames to maintain inter heat dissipation plate spacing is advantageous because the heat sink structure could be assembled by simple stacking, while at the same time the inter heat dissipation plate spacing can be self-maintained by the profile of the spacer frame in the stacking process. As an example, the heat dissipation plates and spacer frames may be stacked alternately. As a further example, the spacer frame and the heat dissipation plate may be formed from conductive plates of the same thickness and outer dimensions. The spacer frame may include at least one window surrounded by an integrally formed spacing rim being formed on the conductive sheet, the window defining the ventilation channel. The spacer frame may have a thickness of less than 3 mm, preferably less than 2 mm, and more preferably less than 1.5 mm.

The display screen may comprise an LCD display panel which is connected to a printed circuit assembly by a flexible ribbon cable arrangement, and wherein the backlight assembly is intermediate the printed circuit assembly and the LCD display panel. The printed circuit assembly and the heat dissipating assembly may be separated by an intermediate thermal insulation layer.

The distributed light source may comprise at least one light array, the at least one light array being arranged for edge coupling light into the light guide plate at one lateral edge thereof. The heat sink structure may comprise a heat sink which is formed into a mounting frame having overhanging wing portions on which the distributed light source is mounted, the mounting frame and the wing portions being arranged to hold the distributed light source and the light guide plate in an edge coupling relationship.

BRIEF DESCRIPTION OF THE DRAWINGS

Exemplary embodiments will be illustrated by way of example with reference to the accompany drawings, in which.

DETAILED DESCRIPTION OF EXEMPLARY EMBODIMENTS

Figure 1:
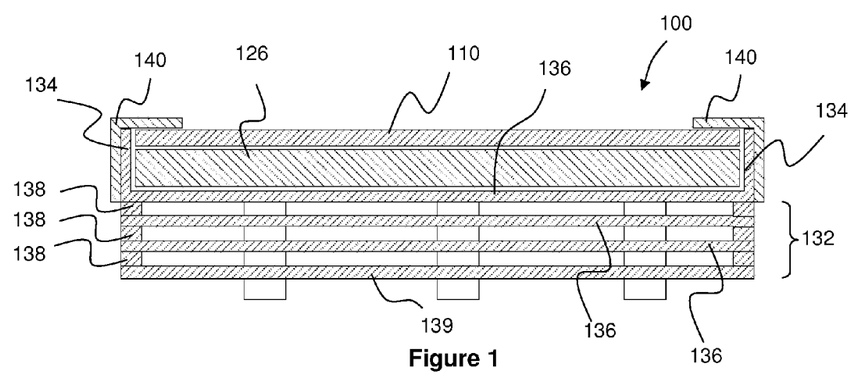
FIGS. 1 and 1A are schematic cross-sectional views taken a long line A-A and line B-B respectively of a first example of an LCD display apparatus of FIG. 3B.
Figure 1A:
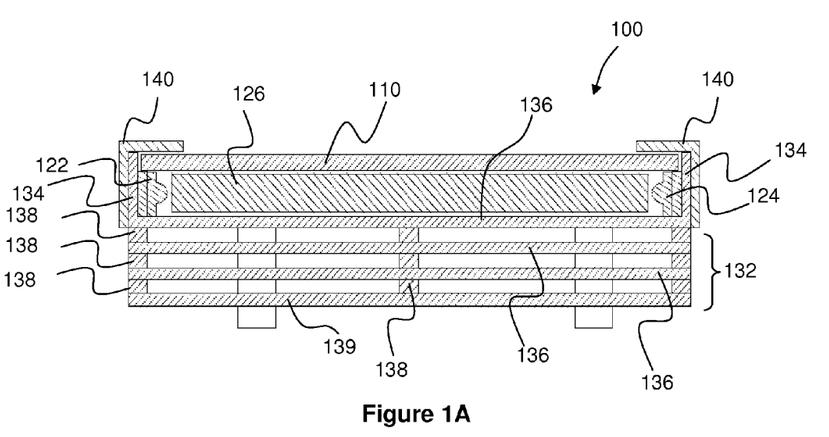
Figure 2:
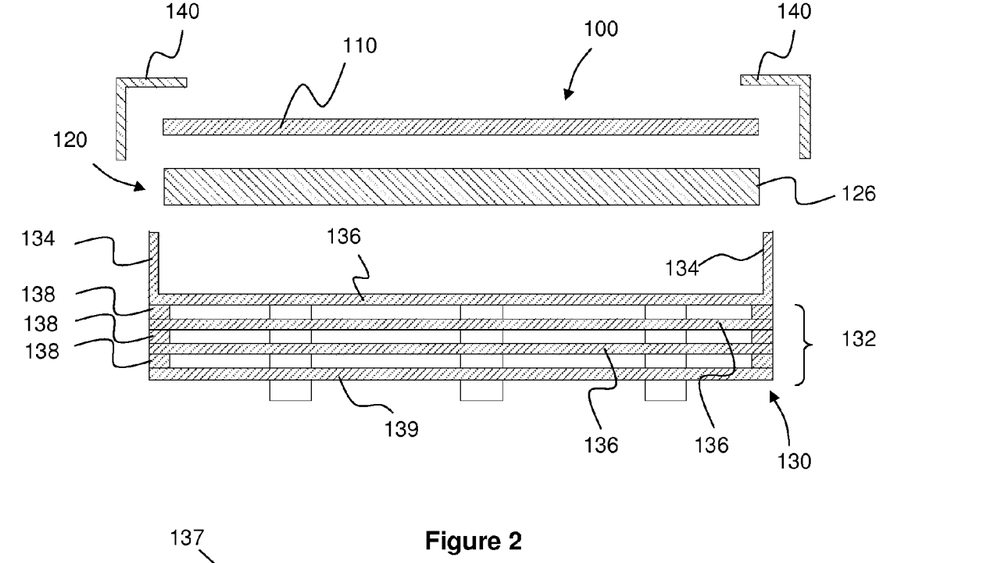
FIG. 2 is an exploded view of FIG. 1.
Figure 3:
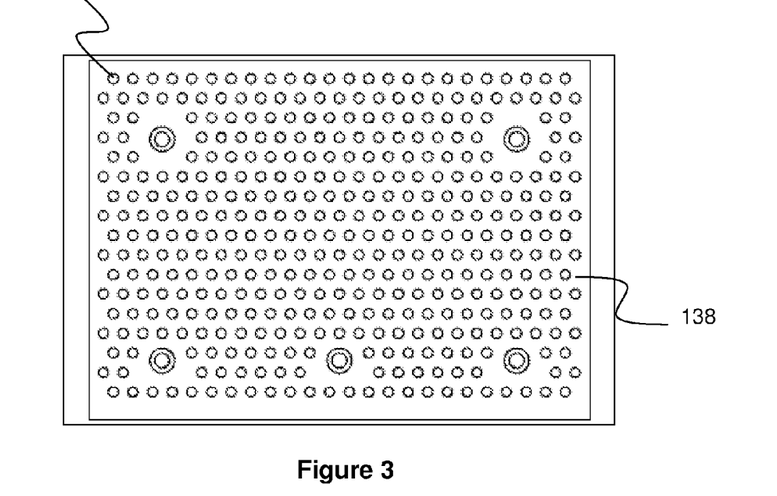
FIG. 3 is a plan view of a perforated heat dissipation plate of the LCD apparatus and a perforated heat dissipation plate mounted on the LCD apparatus respectively.

A first example electronic display apparatus 100 shown in FIGS. 1 to 3 comprises an LCD (liquid crystal display) panel 110, video signal processing circuitry, a backlight arrangement 120, and a heat sink structure 130.

The LCD panel 110, as an example of flat panel display screens, comprises transmissive type LCD cells. Images to be displayed on the LCD panel 110 are fed from a video source via the signal processing circuitry. The video signal processing circuitry is arranged to generate pixel images on individual pixels of LCD screen. As backlights are required to back illuminate a non self-luminous display panel to make images visible or more visible on the display screen, the LCD panel is placed in front of a backlight assembly 120.

For slim displays, backlights usually comprise a distributed light source which is located at one edge of a light guide, such as a rectangular light guide which is also known as a light pipe. Distributed light generated by the backlight source is first edge coupled into the light guide and then propagated forwards towards the display panel by total internal reflection (TIR). Edge coupling of backlight is preferred to minimize the thickness of a display apparatus, such as television, computer monitor, portable computer etc. In edge coupled backlights, the effective direction of light propagated from the distributed light source is usually orthogonal or substantially orthogonal to the effective direction of the backlight projecting onto the display screen.

The backlight arrangement 120 comprises two LED (light emitting diodes) light arrays 122, 124 and a light guide film 126. LEDs are generally preferred for use as a backlight source because of their various advantages, such as higher energy efficiency, longer service life, lower driving voltage, narrower beam width, miniature size, and lower costs.

Each of the LED light arrays 122, 124, as an example of a distributed light source, is arranged as an LED light strip to provide an elongate and distributed light source suitable for edge coupling to provide edge lit back illumination. The light guide film 126, as an example of light guide assembly, is for directing the edge coupled light to project forwardly towards the LCD panel 110 to back illuminate the LCD panel 110. The use of an edge lit back light illumination arrangement facilitates a more compact backlight assembly suitable for use in a slim display apparatus.

As the LED light arrays 122, 124 will generate a substantial amount of heat during operation, especially when designed for and used in outdoor operation, the light arrays 122, 124 are mounted on a heat sink structure 130 to facilitate heat dissipation to mitigate the risk of overheating the LEDs.

The heat sink structure 130 comprises a main body 132, and a light source mounting portion which protrudes from the main body 132. The light mounting portion comprises oppositely facing wing portions 134 which are disposed at opposite ends of the main body 132. Each of the wing portions 134 overhangs the main body 132 and includes an elongate light strip mounting surface which projects orthogonally or substantially orthogonally from the main body 132. The LED strips are mounted on the elongate light strip mounting surfaces of the wing portions 134 in an oppositely facing manner. A good thermal bonding is maintained between a LED strip and the corresponding wing portion to promote efficient heat transfer efficiency.

The separation between the wing portions 134 and the extent or span of the main body 132 in a direction orthogonal to the direction of separation are adapted such that when the LED light arrays 122, 124 are mounted and when a light guide film 126 is placed on the main body 132 and lie intermediate the LED mounted wing portions 134, the lateral edges of the light guide film 126 are oppositely facing the light emitting surfaces of the light arrays 122, 124. By disposing the light guide film 126 such that it lies in a direction or in the plane of light propagation from the light arrays 122, 124, distributed light beams generated by the light arrays will be edge coupled into the light guide film 126 for forward projection onto the LCD panel 110, thereby providing backlighting. The LCD panel 110 is disposed forward of the light guide film 126 and is retained in place by panel fasteners 140 which are attached to the main body 132 of the heat sink.

The heat sink main body 132 comprises a plurality of heat dissipation plates 136 which are thermally connected to the wing portions 134. The main body 132 is intermediate the wing portions 134. With this arrangement, heat generated by the LED strips and transferred to the wing portions 134 will be transferred to the heat dissipation plates 136, and subsequently sunk and dissipated by the heat dissipation plates 136 so that higher powered LED strips can be used for a brighter backlight operation. The wing portions 134 and the heat dissipation plates 136 are usually made of heat sink materials, for example, metal sheets such as aluminum, aluminum alloy, or steel. The main body 132 and the wing portions 134 may be connected by riveting, soldering or welding where appropriate to promote good thermal communication.

To increase heat dissipation rate within a limited volume, the heat sink main body 132 comprises a plurality of heat dissipation plates 136 which is arranged into a stack of heat dissipation plates 136 with ventilation spacing maintained between adjacent heat dissipation plates 136. Each heat dissipation plate is arranged to function as a heat dissipation fin to enhance heat dissipation efficiency. The ventilation spacing forms a ventilation channel or a plurality of ventilation channels between adjacent heat dissipation plates to expedite heat dissipation by thermal exchange with air inside the ventilation channel or channels. The ventilation channel is elongate and extends in the direction of light propagation as well as in a direction orthogonal thereto.

Figure 3A:
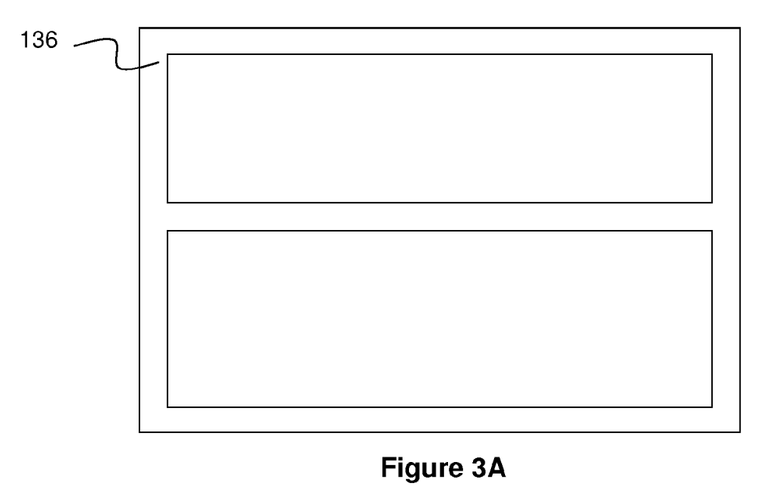
FIG. 3A is a plan view of a spacer frame of the LCD apparatus.
Figure 3B:
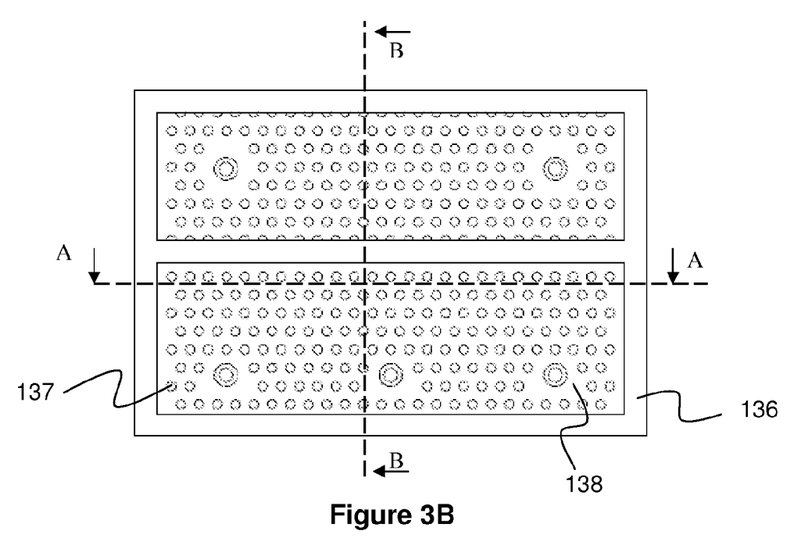
FIG. 3B is a plan view of a spacer frame of FIG. 3A stacked on a perforated heat dissipation plate of FIG. 3, FIGS. 3C and 3D are schematic views showing exemplary heat transfer paths respectively from the light source to the heat dissipation plates and from the heat dissipation plates to ambient via the heat dissipation perforations.

To maintain separation between adjacent heat dissipation plates 136 and to define the ventilation channel or channels, a spacer frame 138 made of a thermal conductive material is placed intermediate adjacent heat dissipation plates. A spacer frame 138 is advantageous because it provides a distributed spacing support as well as distributed thermal interconnection between adjacent heat dissipation plates. In addition, or as alternative, non-distributed spacers such as rod, stud or screw type spacers could be used to maintain spacing between adjacent heat dissipation plates. A distributed spacer 138 such as a thermally conductive spacer frame is advantageous because it could maintain a very thin air gap between adjacent heat dissipating plates 136 to facilitate a very slim heat dissipation assembly of high efficiency. As an example, the spacer frame 138 can be made of a metal sheet of between 0.5-3 mm, although a thickness of between 1-2 mm is probably more useful for display apparatus for outdoor applications. Of course, spacer frames of other thickness could be used without loss of generality. The use of a spacer frame 138 is advantageous because the distributed spacing support associated with the spacer frames means that a wide variety of spacing dimensions could be achieved. For a compact or slim design, a ventilation channel having a slot cross-section thickness, as defined by the spacing, of between 0.5-3 mm, or more specifically between 1-2 mm, could be provided. It is observed that a heat dissipation assembly wherein the thickness of the heat dissipation plates 136 and spacer frame 138 are the same or comparable would provide a very good balance between overall assembly thickness and heat dissipation performance. As an example, the heat dissipation assembly of FIG. 1 comprises 4 heat dissipation plates of 1 mm thickness each and arranged into a stack with 1 mm spacing (due to the thickness of a spacer frame) between adjacent heat dissipation plates. The overall thickness of the heat sink main body 132 is only 7 mm while several times heat dissipation rate can be achieved compared to the conventional single heat dissipation configuration. When the thickness of the heat dissipation plate and spacer frame (or spacer plate) is reduced to 0.8 mm as another example, the entire thickness of this multilayered heat dissipation assembly will be reduced to about 5.6 mm only.

To further enhance heat dissipation rate, distributed perforations 137 are formed on a heat dissipation plate 136 or a plurality of heat dissipation plates. The distributed perforations 137 are arranged to increase effective air contact area of a heat dissipation plate 136 to enhance heat dissipation by thermal exchange with air in a ventilation channel or ventilation channels surrounding the heat dissipation plate 136. To increase effectiveness of such perforations 137, the perforations 137 are distributed on a major portion of the heat dissipation plate 136.

In addition, the distributed perforations are also arranged to facilitate the transportation of heat accumulated in a ventilation channel to outside of the ventilation channel, and eventually to outside of the heat dissipation assembly. To facilitate this, perforations on different heat dissipating plates are communicable via intermediate ventilation channels.

As the heat dissipation plates most distal from the wing portions 134 will be most efficient for thermal exchange due to a larger temperature gradient, it will be advantageous that at least the outermost heat dissipation plates 139, which is most distal from the wing portions 134, or the more distal heat dissipation plates are perforated.

Figure 3C:
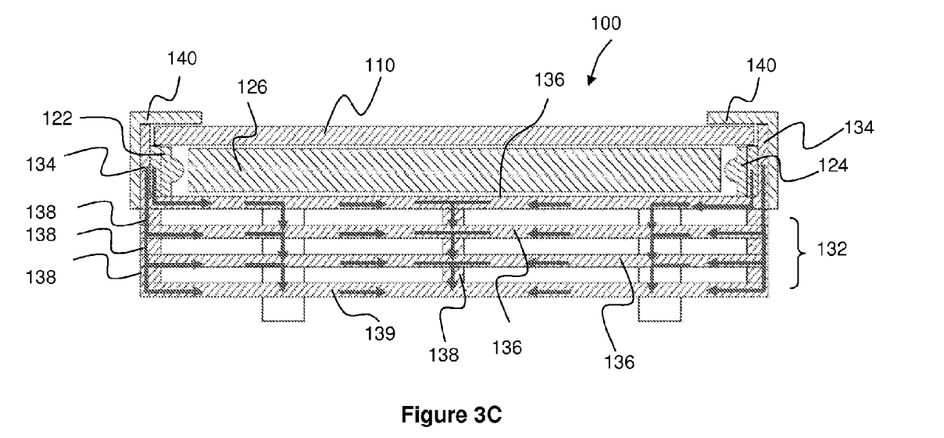
Figure 3D:
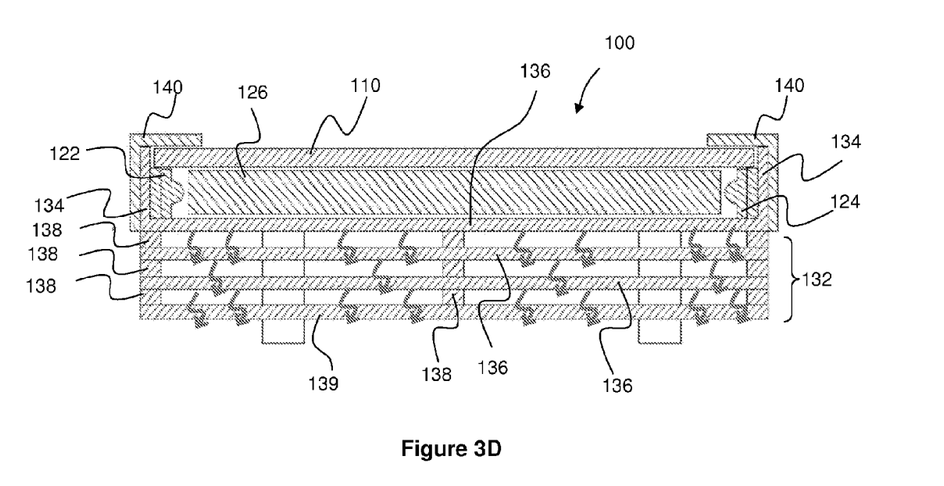
Figure 4:
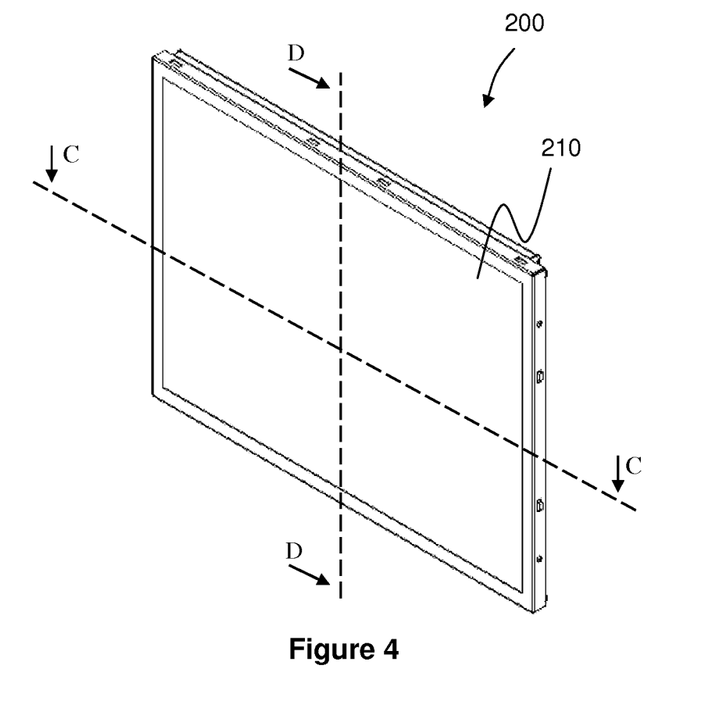
FIG. 4 is a perspective view illustrating a second example of an LCD display apparatus.
Figure 5:
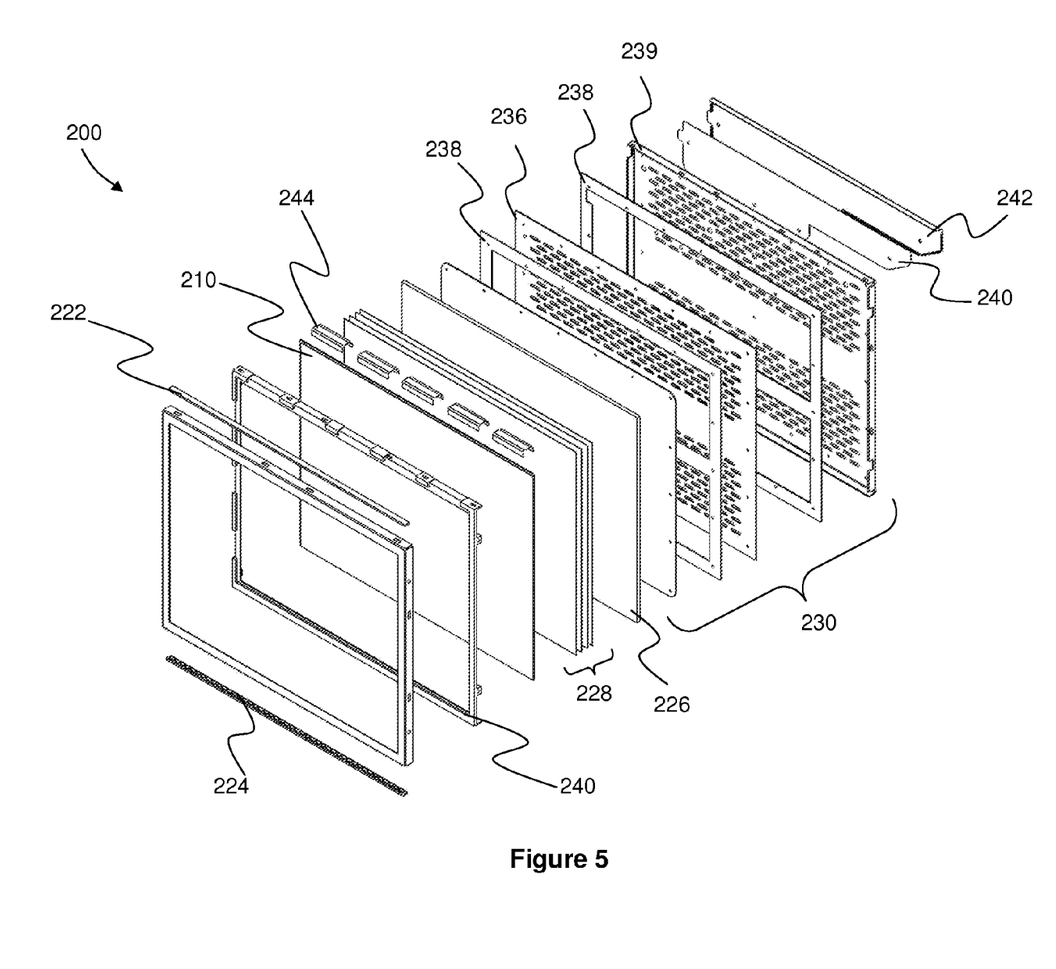
FIG. 5 is an exploded view of the LCD display apparatus of FIG. 4.
Figure 6:
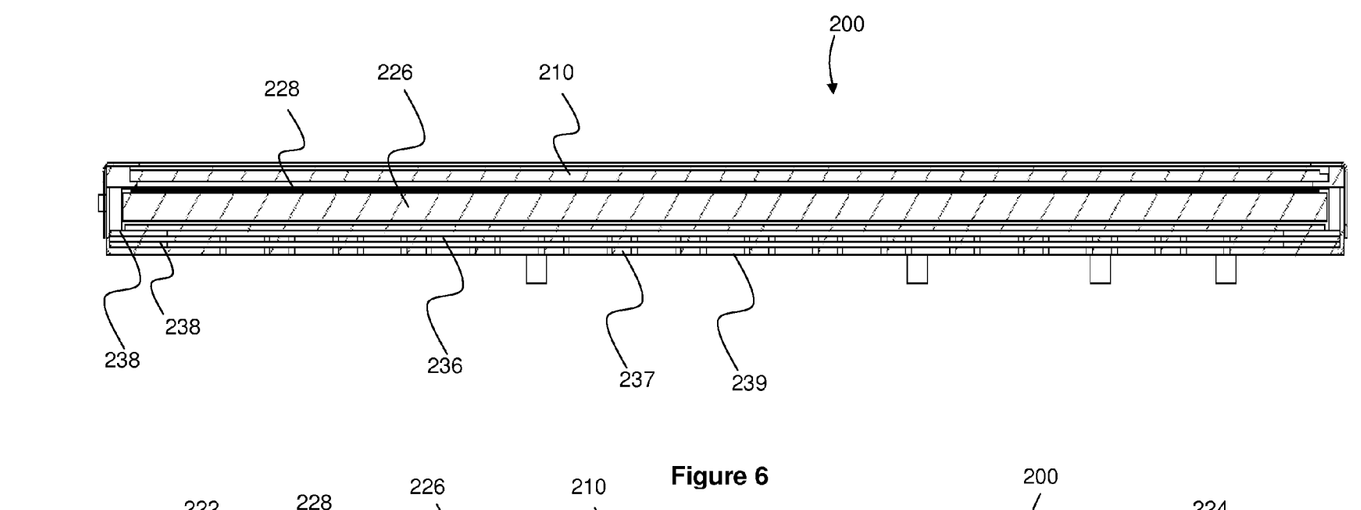
FIG. 6 is a cross sectional view taken along line C-C of the apparatus of FIG. 4.
Figure 7:
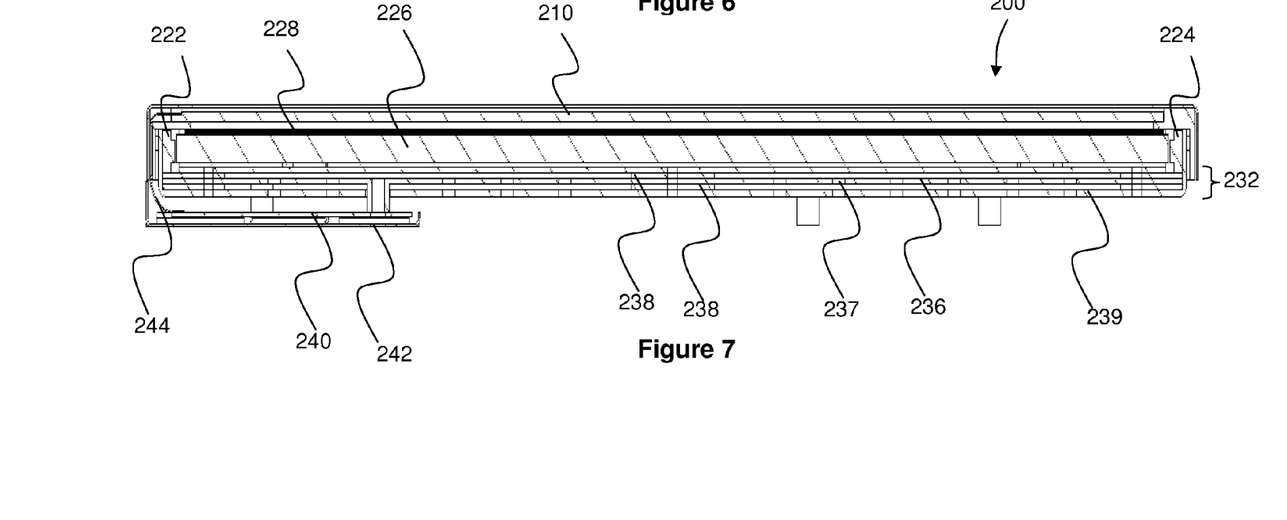
FIG. 7 is a cross sectional view taken along line D-D of the apparatus of FIG. 4.
Figure 8:
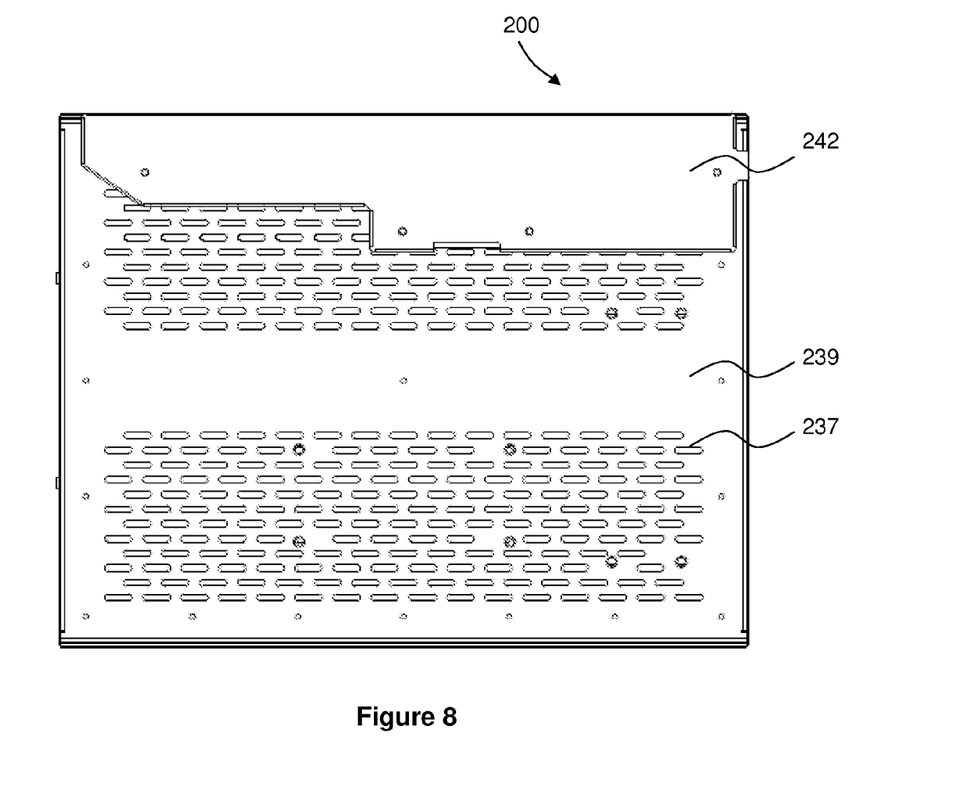
FIG. 8 is a plan view of a heat dissipation plate of the apparatus of FIG. 4.

In use, power is supplied to the LED light arrays 122, 124 to back illuminate the LCD panel 110 and make the pixel images transmitted from the video signal circuitry and appearing on the LCD panel visible. The heat thus generated by the LEDs propagates from the wing portions 134 to the plurality of heat dissipating plates of main body, and is then dissipated into the ambient via the plurality of perforations (or heat dissipating apertures) as schematically shown by arrow indications of FIGS. 3C & 3D. By having the plurality of heat dissipation plates operating as heat dissipation fins, the heat dissipation ability of the heat sink structure per unit volume by the heat sink structure is substantially enhanced.

In the second example of an LCD display apparatus as shown in FIGS. 4 to 8, the structure of the LCD display 200 is substantially identical to that of the first example, and the same figure reference numerals used in relation to the first example plus 100 are used and the above description is incorporated herein by reference. In this second example, two spacer frames 238 defining two layers of ventilation channels are used, and the light guide assembly includes other optical arrangement, such as diffusers 228 in addition to the light guide film 226. In addition, a printed circuit assembly which is mounted on a printed circuit mounting frame 242 is also illustrated. The printed circuit assembly comprises a printed circuit board 240 which is connected to the LCD panel via a flexible cable 244. The light guide assembly 220 as well as the heat sink structure 230 are immediate the printed circuit board 240 and the LCD panel 210. As a general rule, the wraps around portion of the ribbon cable also determine the thickness of all the components between the printed circuit mounting frame 242 and the LCD panel. To mitigate adverse heat influence on the printed circuit board, the printed circuit mounting frame 242 is attached to the outermost heat dissipation plate 239 with a thermal insulating layer in between.

In another example, the wing portions and a heat dissipation plate most proximal the light guide film are integrally formed into a tray or receptacle for holding the light guide film and the LCD panel for substantially seamless heat transfer from the wing portions to the most proximal heat dissipation plate to facilitate a more effective cascaded heat propagation towards other heat dissipation plates. For example, the tray or receptacle can be formed from a metal sheet, for example, by extrusion or stamping. The other heat dissipation plates are then physically connected to the tray or receptacle in known manner to form a stack of spaced apart heat dissipation plates.

While the present invention has been explained with reference to the embodiments described herein, it would be appreciated by persons skilled in the art that the embodiments are non-limiting example only, and the invention is independent of any particular types of backlight modules or heat sink materials without loss of generality. For example, while the exemplary display apparatus use LEDs as a backlight source because LEDs has good backlight characteristics, other backlight source can be used without loss of generality.

| Table of numerals | | |
|---|---|---|
| 100 | 200 | Display apparatus |
| 110 | 210 | LCD panel |
| 120 | 220 | Backlight arrangement |
| 122 | 222 | LED light array |
| 124 | 224 | LED light array |
| 126 | 226 | Light guide film |
|  | 228 | Diffuser |
| 130 | 230 | Heat sink structure |
| 132 | 232 | Main body of heat sink structure |
| 134 | 234 | Wing portion |
| 136 | 236 | Heat dissipation plate |
| 137 | 237 | Perforations |
| 138 | 238 | Spacer frame |
| 139 | 239 | Outermost heat dissipation plate |
|  | 240 | Printed circuit board |
|  | 242 | Printed circuit mounting frame |
|  | 244 | Flexible cable |
| 140 | 240 | Panel fastener |

The invention claimed is:

1. A display apparatus comprising a display screen and a backlight assembly, wherein the backlight assembly comprises a distributed light source and a light guide plate having at least two lateral edges, the light guide plate and the distributed light source being arranged such that light emitted by the distributed light source is edge coupled into the light guide plate for forward projection onto the display screen to back illuminate the display screen, and the distributed light source being mounted on a heat sink structure, wherein the heat sink structure comprises a plurality of spaced-apart heat dissipating plates which is in thermal communication with the distributed light source and which spans between the two lateral edges of the light guide plate, wherein the heat sink structure comprises at least one heat dissipating plate which is distributedly perforated, the distributed perforations being arranged to permit air to move from a ventilation channel proximal the display panel to an adjacent ventilation channel more distal from the display panel, or from one ventilation channel to outside the heat dissipating assembly.

2. A display apparatus according to claim 1, wherein the extent of the heat dissipating plate in a direction transverse to that of the direction of spanning is larger than or comparable to that of the corresponding extent of the display surface of the display panel.

3. A display apparatus according to claim 1, wherein the heat sink structure spans across the two lateral edges of the light guide plate and extends in a direction transverse to that of the direction of spanning such that the footprint of the heat sink structure covers or substantially covers the light guide plate or the display screen.

4. A display apparatus according to claim 3, wherein the span of the heat dissipating plates exceeds the corresponding span of the display surface of the display panel.

5. A display apparatus according to claim 1, wherein the heat dissipating plates are stacked behind the display panel such that a ventilation channel or a plurality of ventilating channels is formed between adjacent heat dissipating plates, the ventilating channel being adapted to facilitate dissipation of heat generated by the distributed light source and transferred to the heat dissipating plates by convection.

6. A display apparatus according to claim 5, wherein the ventilation channel has an elongate cross-section which runs parallel and transverse to a lateral edge of the light guide plate which is edge coupled to the distributed light source.

7. A display apparatus according to claim 1, wherein a plurality of immediately adjacent heat dissipation plates is distributedly perforated, the perforations and the ventilation channels associated with the plurality of immediately adjacent heat dissipation plates being arranged such that air from a ventilation channel most proximal the display screen is communicable to a ventilation channel most distal from the display screen via the perforations.

8. A display apparatus according to claim 7, wherein the perforations on a heat dissipation plate are distributed on a major portion of the heat dissipating plate to dissipate heat generated by the distributed light source and transferred to the heat dissipating plates.

9. A display apparatus according to claim 1, wherein at least the heat dissipating plates which is most distal from the display screen is perforated.

10. A display apparatus comprising a display screen and a backlight assembly, wherein the backlight assembly comprises a distributed light source and a light guide plate having at least two lateral edges, the light guide plate and the distributed light source being arranged such that light emitted by the distributed light source is edge coupled into the light guide plate for forward projection onto the display screen to back illuminate the display screen, and the distributed light source being mounted on a heat sink structure, characterized in that the heat sink structure comprises a plurality of spaced-apart heat dissipating plates which is in thermal communication with the distributed light source and which spans between the two lateral edges of the light guide plate, wherein the spacing between adjacent heat dissipation plates is comparable to the thickness of the heat dissipation plates.

11. A display apparatus according to claim 10, wherein the space between adjacent heat dissipating plates is maintained by at least one thermally conductive spacer, the thermally conductive spacer being in the form of a spacer frame.

12. A display apparatus according to claim 11, wherein the spacer frame is in distributed thermal contact with adjacent heat dissipating plates.

13. A display apparatus according to claim 12, wherein the spacer frame includes at least one window surrounded by an integrally formed spacing rim being formed on the conductive sheet, the window defining the ventilation channel.

14. A display apparatus according to claim 11, wherein the spacer frame is integrally formed from a conductive sheet.

15. A display apparatus according to claim 11, wherein the spacer frame has a thickness selected from the group consisting of less than 3 mm, less than 2 mm, and less than 1.5 mm.

16. A display apparatus comprising a display screen and a backlight assembly, wherein the backlight assembly comprises a distributed light source and a light guide plate having at least two lateral edges, the light guide plate and the distributed light source being arranged such that light emitted by the distributed light source is edge coupled into the light guide plate for forward projection onto the display screen to back illuminate the display screen, and the distributed light source being mounted on a heat sink structure, wherein the heat sink structure comprises a plurality of spaced-apart heat dissipating plates which is in thermal communication with the distributed light source and which spans between the two lateral edges of the light guide plate, wherein the spacing between adjacent heat dissipating plates is selected from the group consisting of less than 3 mm, less than 2 mm, and less than 1.5 mm.

17. A display apparatus comprising a display screen and a backlight assembly, wherein the backlight assembly comprises a distributed light source and a light guide plate having at least two lateral edges, the light guide plate and the distributed light source being arranged such that light emitted by the distributed light source is edge coupled into the light guide plate for forward projection onto the display screen to back illuminate the display screen, and the distributed light source being mounted on a heat sink structure, wherein the heat sink structure comprises a plurality of spaced-apart heat dissipating plates which is in thermal communication with the distributed light source and which spans between the two lateral edges of the light guide plate, and at least one of the heat dissipating plate is distributedly perforated, the distributed perforations being arranged to permit air to move from a ventilation channel proximal the display panel to an adjacent ventilation channel more distal from the display panel, or from one ventilation channel to outside the heat dissipating assembly, wherein the display screen comprises an LCD display panel which is connected to a printed circuit assembly by a flexible ribbon cable arrangement, and wherein the backlight assembly is intermediate the printed circuit assembly and the LCD display panel, and wherein the printed circuit assembly comprises a printed circuit board which is mounted on a mounting frame, the heat sink structure being mounted intermediate the mounting frame and the LCD display panel, wherein the printed circuit assembly and the heat dissipating assembly are separated by an intermediate thermal insulation layer.

18. A display apparatus according to claim 17, wherein the distributed light source comprises at least one light array, the at least one light array being arranged for edge coupling light into the light guide plate at one lateral edge thereof, wherein the distributed light source comprises two light arrays, the two light arrays being arranged for edge coupling light respectively into the two lateral edges of the light guide plate.

19. A display apparatus according to claim 17, wherein the heat sink structure comprises a heat sink which is formed into a mounting frame having overhanging wing portions on which the distributed light source is mounted, the mounting frame and the wing portions being arranged to hold the distributed light source and the light guide plate in an edge coupling relationship, wherein the distributed light source comprises two light arrays mounted on two wing portions, and the heat sink structure extends between the two wing portions.

* * * * *